US00RE44153E

(19) United States
(12) Reissued Patent
Laurent et al.

(10) Patent Number: US RE44,153 E
(45) Date of Reissued Patent: Apr. 16, 2013

(54) COATED HOT- AND COLD-ROLLED STEEL SHEET COMPRISING A VERY HIGH RESISTANCE AFTER THERMAL TREATMENT

(75) Inventors: Jean-Pierre Laurent, Istres (FR); Jean-Paul Hennechart, Floing (FR); Dominique Spehner, Sedan (FR); Jacques Devroc, Salon de Provence (FR)

(73) Assignee: ArcelorMittal Atlantique et Lorraine (FR)

(21) Appl. No.: 13/205,126

(22) Filed: Aug. 8, 2011

Related U.S. Patent Documents

Reissue of:
(64) Patent No.: 6,296,805
Issued: Oct. 2, 2001
Appl. No.: 09/350,100
Filed: Jul. 9, 1999

(30) Foreign Application Priority Data

Jul. 9, 1998 (FR) ..... 98 08793

(51) Int. Cl.
*C21D 8/02* (2006.01)
*B32B 15/08* (2006.01)
*C22C 38/06* (2006.01)
*C22C 38/18* (2006.01)

(52) U.S. Cl.
USPC ..... 420/104; 428/653; 428/939; 148/531; 148/537

(58) Field of Classification Search ..... None
See application file for complete search history.

(56) References Cited

U.S. PATENT DOCUMENTS

| | | | | |
|---|---|---|---|---|
| 4,655,852 | A | | 4/1987 | Rallis |
| 4,891,274 | A | * | 1/1990 | Higuchi et al. |
| 5,133,815 | A | * | 7/1992 | Hashimoto et al. |
| 5,178,688 | A | | 1/1993 | Yu et al. |
| 5,656,102 | A | * | 8/1997 | Taylor et al. |

FOREIGN PATENT DOCUMENTS

| | | | |
|---|---|---|---|
| CH | 382512 | | 11/1964 |
| DE | 1252034 | | 10/1967 |
| FR | 1297906 | | 5/1962 |
| FR | 2 625 227 | | 6/1989 |
| JP | 09-025551 | * | 1/1997 |
| JP | 09-195021 | * | 7/1997 |
| SU | 1555374 | | 4/1990 |

OTHER PUBLICATIONS

"Final Jury Instructions", In The United States District Court For the District of Delaware, Case No. 1:10-cv-00050SLR, Document #212, Filed Jan. 14, 2011, 44 pages.

"Jury Verdict Sheet", In The United States District Court For the District of Delaware, Case No. 1:10-cv-00050SLR, Document #215, Filed Jan. 14, 2011, 7 pages.

"Defendant's Opposition to Plaintiff's Renewed Motion for Judgment as a Matter of Law", In The United States District Court For the District of Delaware, Case No. 1:10-cv-00050SLR, Document #236, Filed Mar. 10, 2011, 28 pages.

"Plaintiff's Opening Brief in Support of Renewed Motion for Judgment as a Matter of Law", In The United States District Court For the District of Delaware, Case No. 1:10-cv-00050SLR, Document #227, Filed Feb. 17, 2011, 29 pages.

"Plaintiff's Reply Brief in Support of Renewed Motion for Judgment as a Matter of Law", In The United States District Court For the District of Delaware, Case No. 1:10-cv-00050SLR, Document #239, Filed Mar. 24, 2011, 17 pages.

Bano et al., "Heat Treated Boron Steels in the Automotive Industry", 39$^{th}$ MWSP Conference Proceedings, ISS, vol. XXXV, 1998, 673-677.

English Translation for Foreign Patent FR 1297906, May 28, 1962, 6 pages.

Ford Engineering Material Specification, "Steel, Sheet, Boron Treated, High Strength", Specification No. WSB-M1A322-A1, 1992, 3 pages.

Gierek, "Tauchalitieren—Eigenschaften und Einsatzgebiete", XP-002114744, 1976, 4 pages.

*Arcelor Mittal* v. *AK Steel Corp,* Decision by the United States Court of Appeals for the Federal Circuit for an appeal from the United States District Court for the District of Delaware in Case No. 10-CV-0050, 2011-1638, Decided Nov. 30, 2012, 25 pages.

Patent Abstracts of Japan; vol. 15, No. 17; Jan. 14, 1991; & JP 02 263954; Oct. 26, 1990.

Patent Abstracts of Japan; vol. 13, No. 457; Oct. 16, 1989; & JP 01 176056; Jul. 12, 1989.

Patent Abstracts of Japan; vol. 18, No. 523; Oct. 4, 1994; & JP 06 179944; Jun. 28, 1994.

Patent Abstracts of Japan; vol. 18, No. 004; Jan. 6, 1994; & JP 05 247588; Sep. 24, 1993.

* cited by examiner

*Primary Examiner* — Jennifer McNeil
*Assistant Examiner* — Jason Savage
(74) *Attorney, Agent, or Firm* — Woodcock Washburn LLP; David W. Schumaker

(57) ABSTRACT

Hot-rolled steel sheet which then can be cold-rolled, coated, the steel in the sheet having the following composition by weight:

0.15%<carbon<0.5%
0.5%<manganese<3%
0.1%<silicon<0.5%
0.01%<chromium<1%
titanium<0.2%
aluminum<0.1%
phosphorus<0.1%
sulfur<0.05%
0.0005%<boron<0.08%, the remainder being iron and impurities inherent in processing, the sheet ensuring a very high mechanical resistance after thermal treatment and the aluminum-based coating ensuring a high resistance to corrosion.

25 Claims, No Drawings

COATED HOT- AND COLD-ROLLED STEEL SHEET COMPRISING A VERY HIGH RESISTANCE AFTER THERMAL TREATMENT

Matter enclosed in heavy brackets [ ] appears in the original patent but forms no part of this reissue specification; matter printed in italics indicates the additions made by reissue.

The invention relates to a coated, hot- and cold-rolled steel sheet comprising a very high resistance after thermal treatment.

In this technical area, the proposed solutions involving an increase in the mechanical characteristics are accomplished to the detriment of shaping properties. There is a solution consisting in separating the shaping properties and those required for use. The characteristics required for use are obtained through a thermal treatment subsequent to or concomitant with shaping. In this case, the proposed sheets are not delivered coated because of problems of holding power of the coating at the time of thermal treatment. Coating therefore is performed on finished castings, which requires a careful cleaning of the surfaces and the hollowed portions. In addition, the thermal treatment must be performed under a controlled atmosphere in order to prevent any decarbonization and oxidation of the metal in the sheet. Steel sheets for thermal treatment do not have any pre-coating which requires post-treatments of scouring, pickling and coating.

At the time of continuous coating of flat hot- and cold-rolled products, preliminary annealing and cooling preceding or following the zinc- or aluminum-based coating operation, are used only to bring the sheet to a temperature close to that of the bath or to restore the mechanical properties of the sheet degraded at the time of cold-rolling. These thermal cycles are chosen in terms of the composition of the steel so that no allotropic transformation takes place at the time of the thermal cycle, the objective being to obtain mechanical characteristics similar to those measured on the steel sheet delivered uncoated.

The purpose of the invention is to produce a hot- or cold-rolled steel sheet of a desired thickness, coated, and affording extensive shaping possibilities and which, after thermal treatment performed on the finished casting, makes it possible to obtain a mechanical resistance in excess of 1000 MPa, a substantial resistance to shocks, fatigue, abrasion and wear, while retaining a good resistance to corrosion as well as a good capacity for painting and gluing. It also is possible to carry out hot-shaping with hardening in the tool making it possible to obtain the same properties.

The subject of the invention is a hot-rolled steel sheet, which then can be cold-rolled, coated, the steel in the sheet having the following composition by weight:

0.15%<carbon<0.5%
0.5%<manganese<3%
0.1% silicon<0.5%
0.01%<chromium<1%
titanium<0.2%
aluminum<0.1%
phosphorus<0.01%
sulfur<0.05%
0.0005%<boron<0.08%, the remainder being iron and impurities inherent in processing, the sheet ensuring a very high mechanical resistance after thermal treatment and the aluminum-based coating ensuring a high resistance to corrosion.

The other characteristics of the invention are:

the composition by weight of the sheet preferably is the following:
0.20%<carbon<0.5%
0.8%<manganese<1.5%
0.1% silicon<0.35%
0.01%<chromium<1%
titanium<0.1%
aluminum<0.1%
phosphorus<0.05%
sulfur<0.03%
0.0005%<boron<0.01%, the remainder being iron and impurities inherent in processing.

in the composition by weight of the sheet, the titanium content with respect to the nitrogen content is in excess of 3.42, the boron no longer being able to be combined with the nitrogen.

the metal bath for the coating contains in its basic composition by weight, from 9% to 10% silicon, from 2% to 3.5% iron, the remainder being aluminum.

the metal bath for the coating contains in its basic composition by weight, from 2% to 4% iron, the remainder being aluminum.

The invention also concerns a process for producing a casting starting from the coated sheet in which, after shaping, the coating of the casting is subjected to an increase in temperature at a speed in excess of 5° C./second, which may exceed 600° C./second.

A further characteristic of the process is:

the coating and the casting are heated to a temperature in excess of 750° C.

The invention also concerns the use of the hot-rolled steel sheet which then can be cold-rolled and coated, for structural and/or anti-intrusion or substructure castings for a land motor vehicle, such as, for example, a bumper bar, a door reinforcement, a wheel spoke.

The description which follows will make the invention clearly understood.

The sheet according to the invention which derives, by reason of its processing, from a hot-rolling mill, possibly may be cold-rerolled again depending on the final thickness desired. It then is coated with an aluminum-based coating, for example by dipping in a bath containing, in addition, from 8% to 11% silicon, from 2% to 4% iron, the sheet having a high mechanical resistance after thermal treatment and a high resistance to corrosion, as well as a good capacity for painting and gluing.

The coating has in particular the function of protecting the basic sheet against hot as well as cold corrosion. The mechanical characteristics in the delivery state of the sheet according to the invention allow a great variety of shaping, in particular a deep stamping. The thermal treatment applied at the time of a hot-shaping process or after shaping makes it possible to obtain high mechanical characteristics which may exceed 1500 MPa for mechanical resistance and 1200 MPa for the limit of elasticity. The final mechanical characteristics are adjustable and depend on the carbon content of the steel and on the thermal treatment.

At the time of thermal treatment performed on a finished casting or at the time of a hot-shaping process, the coating forms a layer having a substantial resistance to abrasion, wear, fatigue, shock, as well as a good resistance to corrosion and a good capacity for painting and gluing.

According to the invention, the steel the weight composition of which is the following:

0.15%<carbon<0.5%

0.5%<manganese<3%

0.1%<silicon<0.5%

0.01%<chromium<1% titanium<0.2% aluminum<0.1% phosphorus<0.1% sulfur<0.05%

0.0005%<boron<0.08%, the remainder being iron and impurities inherent in processing, is processed in the form of a hot-rolled and possibly cold-rolled sheet to obtain the desired thickness. The steel sheet then is coated by dipping, after pickling, in an aluminum bath containing either from 8% to 11% silicon and 2% to 4% iron, or from 2% to 4% iron, or even in an aluminum bath preferably containing from 9% to 10% silicon and 2% to 3.5% iron.

In an example of implementation of a coating of the sheet by dipping in a metal bath containing an aluminum alloy comprising a proportion of approximately 90% aluminum, the coating layer comprises a first alloy layer in contact with the surface of the steel. This layer, directly in contact with the surface of the sheet, is highly alloyed with iron.

A second coating layer, on top of the first, contains approximately 90% aluminum and may contain silicon and a small amount of iron, depending on the composition of the bath.

The first alloy layer may crack when the sheet is shaped for the manufacture of castings.

According to the invention, after the shaping of the casting, the coating is subjected to an increase in temperature at a speed in excess of 5° C./second, which may exceed 600° C./second. This rise in temperature makes possible a rapid remelting of the aluminum which fills in the cracks generated by the operation of shaping of the casting.

Another advantage of the invention lies in the fact that the diffusion of the iron in the coating will be initiated at high temperature. One thus will have a better cohesion between coating and steel in the sheet. In another form of the invention, the thermal treatment may be performed locally, in heavily deformed zones.

In an example of implementation, the steel sheet according to the invention containing 0.21% carbon, 1.14% manganese, 0.020% phosphorus, 0.0038% sulfur, 0.25% silicon, 0.040% aluminum, 0.009% copper, 0.020% nickel, 0.18% chromium, 0.0040% nitrogen, 0.032% titanium, 0.003% boron, 0.0050% calcium is coated with an aluminum-based layer about 20 μm in thickness.

According to the invention the sheet, in the delivery state in a coil or in sheeting, the thickness of which may range between 0.25 mm and 15 mm, has good shaping properties and a good resistance to corrosion as well as a good capacity for painting or gluing.

The sheet, a coated siderurgic product, has a substantial resistance to corrosion in the delivery state, during shaping and thermal treatments as well as during usage of the finished casting. After thermal treatment, a substantial mechanical resistance, which may exceed 1500 MPa, is obtained. The presence of the coating at the time of thermal treatment of the castings makes it possible to prevent any decarbonization of the base metal as well as any oxidation. That is an undeniable advantage, in particular in the case of hot-shaping. Furthermore, heating of the treated casting does not require a furnace having a controlled atmosphere to prevent a decarbonization.

Thermal treatment of the metal in the sheet consists in a heating at a temperature ranging between Ac1, starting temperature of austenitic transformation, for example 750° C. and 1200° C., in a furnace, for a period which depends on the temperature to be reached and the thickness of the casting sheet. The composition is optimized so as to limit the enlargement of the grains at the time of thermal treatment. If the structure sought is completely martensitic, the holding temperature should be in excess of Ac3, for example 840° C., ending temperature of austenitic formation. The temperature holding should be followed by a cooling adjusted to the final structure sought. For a completely martensitic structure and for a steel having the composition of the example, the speed of cooling should be in excess of the critical speed of hardening which is 27° C./s for an austenitizing at 900° C. for 5 min., the sheet having a thickness of approximately 1 mm.

It also is possible to obtain in particular ferrito-bainitic or ferrito-martensitic structures, by a heating at a temperature ranging between Ac1, for example 750° C. and Ac3, for example 840° C., followed by an appropriate cooling. According to the level of resistance to be achieved and the thermal treatment applied, one or several of these phases is/are present in variable proportions. For the highest resistance levels, the structure is composed predominantly of martensite.

Chromium, manganese, boron and carbon are added, in the composition of the steel according to the invention, for their effect on hardenability. In addition, carbon makes it possible to achieve high mechanical characteristics thanks to its effect on the hardness of the martensite.

Aluminum is introduced into the composition in order to trap oxygen and to protect the effectiveness of the boron.

Titanium, the ratio of the content of which with respect to the nitrogen content should be in excess of 3.42, is introduced in order to prevent combining of the boron with the nitrogen, the nitrogen being combined with titanium.

The alloying elements, Mn, Cr, B, make possible a hardenability allowing hardening in the stampers or the use of mild hardening fluids limiting deformation of the castings at the time of thermal treatment. In addition, the composition according to the invention is optimized from the point of view of weldability.

The steel in the sheet may undergo a treatment for globularization of sulfides performed with calcium, which has the effect of improving the fatigue resistance of the sheet.

The steel is particularly suited to the production of structural and anti-intrusion castings.

The proposed coating makes it possible to avoid different surface-preparation operations such as for steel sheets for thermal treatment not having any coating.

The modulation of thermal treatment parameters makes it possible to achieve, with a given composition, different levels of hot and cold sheet resistance according to the thickness sought.

At the time of thermal treatment, the base coating, of aluminum for example, is transformed into a layer alloyed with iron and comprising different phases depending on the thermal treatment and having a considerable hardness which may exceed 600 HV100 g.

Table 2 presents an example of maximal resistance of the steel sheet according to the invention after thermal treatment.

| Thermal treatment | Rm (MPa) |
|---|---|
| 850° C./5 min. | 1695 |
| 900° C./5 min. | 1675 |
| 950° C./5 min. | 1665 |

What is claimed is:

1. A hot-rolled coated steel sheet comprising a hot-rolled steel sheet coated with an aluminum or aluminum alloy coating, wherein the steel in the sheet comprises the following composition by weight:

0.15%<carbon<0.5%
0.5%<manganese<3%
0.1%<silicon<0.5%
0.01%<chromium<1%
titanium<0.2%
aluminum<0.1%
phosphorus<0.1%
sulfur<0.05%
0.0005%<boron<0.08%, the remainder being iron and impurities inherent in processing, and the steel sheet has a very high mechanical resistance after thermal treatment and the aluminum or aluminum alloy coating provides a high resistance to corrosion of the steel sheet.

2. The coated steel sheet according to claim 1, wherein the composition by weight of the sheet further comprises the following:

0.20%<carbon<0.5%
0.8%<manganese<1.5%
0.1%<silicon<0.35%
0.01%<chromium<1%
titanium<0.1%
aluminum<0.1%
phosphorus<0.05%
sulfur<0.03%
0.0005%<boron<0.01%, the remainder being iron and impurities inherent in processing.

3. A heat treated coated steel sheet prepared by subjecting the coated steel sheet according to claim 2, to an increase in temperature at a speed in excess of 600° C./second.

4. A process for producing a casting comprising
shaping the coated steel sheet of claim 2,
subjecting the shaped coated steel sheet to an increase in temperature at a speed in excess of 5° C./sec.

5. The coated steel sheet according to claim 1, wherein the ratio of titanium to nitrogen in the steel sheet in weight % is in excess of 3.42.

6. A process for producing a casting comprising
shaping the coated steel sheet of claim 5,
subjecting the shaped coated steel sheet to an increase in temperature at a speed in excess of 5° C./sec.

7. The coated steel sheet according to claim 1, wherein the aluminum or aluminum alloy coating comprises from 9% to 10% silicon by weight, from 2% to 3.5% iron by weight, the remainder being aluminum.

8. A process for producing a casting comprising
shaping the coated steel sheet of claim 7,
subjecting the shaped coated steel sheet to an increase in temperature at a speed in excess of 5° C./sec.

9. The coated steel sheet according to claim 1, wherein the coating comprises from 2% to 4% iron by weight, the remainder being aluminum.

10. A process for producing a casting comprising
shaping the coated steel sheet of claim 9,
subjecting the shaped coated steel sheet to an increase in temperature at a speed in excess of 5° C./sec.

11. A process for producing a casting comprising
shaping the coated steel sheet of claim 1,
subjecting the shaped coated steel sheet to an increase in temperature at a speed in excess of 5° C./second.

12. The process according to claim 11, wherein the casting is heated to a temperature in excess of 750° C.

13. A heat treated coated steel sheet prepared by subjecting the coated steel sheet according to claim 1 to an increase in temperature at a speed in excess of 600° C./second.

14. A land motor vehicle comprising the heat treated coated steel of claim 13.

15. A land motor vehicle comprising the coated steel sheet of claim 1.

16. A heat treated coated steel sheet prepared by subjecting the coated steel sheet according to claim 1 to a temperature in excess of 750° C.

*17. The heat treated coated steel sheet of claim 16, manufactured by a process comprising hot-shaping the coated steel sheet, and cooling the hot-shaped sheet at a rate that produces martensitic structures, ferrite-martensitic structures, or ferrite-bainitic structures.*

*18. The coated steel sheet of claim 1 that is manufactured by a process comprising providing said hot rolled steel sheet; and coating said hot rolled steel sheet with an aluminum coating or aluminum alloy coating.*

*19. The coated steel sheet of claim 18 that is manufactured by dipping said hot rolled steel sheet into a molten aluminum bath or molten aluminum alloy bath.*

*20. The coated steel sheet of claim 19 that is manufactured by pickling said hot rolled steel sheet before said dipping.*

*21. The coated steel sheet of claim 20 that is manufactured by cold rolling said hot rolled steel sheet after said pickling.*

*22. The coated steel sheet of claim 18 that is manufactured by cold rolling said hot rolled steel sheet before said coating.*

*23. The coated steel sheet of claim 1, wherein said mechanical resistance is in excess of 1000 MPa.*

*24. The coated steel sheet of claim 1, wherein said mechanical resistance is in excess of 1500 MPa.*

*25. The coated steel sheet of claim 24 that is composed predominantly of martensite.*

* * * * *

UNITED STATES PATENT AND TRADEMARK OFFICE

CERTIFICATE OF CORRECTION

PATENT NO. : RE44,153 E
APPLICATION NO. : 13/205126
DATED : April 16, 2013
INVENTOR(S) : Jean-Pierre Laurent et al.

It is certified that error appears in the above-identified patent and that said Letters Patent is hereby corrected as shown below:

Title Page,
Item (73) Assignee:

After "ArcelorMittal Atlantique et Lorraine (FR)" insert -- ; ArcelorMittal France (FR) --.

Signed and Sealed this
Ninth Day of August, 2016

Michelle K. Lee

Michelle K. Lee
*Director of the United States Patent and Trademark Office*